Figure 1:
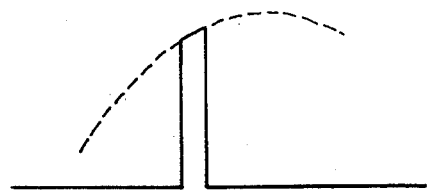

Dec. 8, 1959  G. V. A. GUSTAFSSON ET AL  2,916,701
METHOD AND DEVICE FOR MEASURING ELECTRICAL VOLTAGES
Filed Oct. 7, 1955  2 Sheets-Sheet 1

Inventors
G.V.A. Gustafsson
C.O. Olsson
By Glascock Downing Seubold
Attys.

ice 2,916,701
Patented Dec. 8, 1959

2,916,701

METHOD AND DEVICE FOR MEASURING ELECTRICAL VOLTAGES

Gotthard Viktor Arnold Gustafsson, Bromma, and Carl Olof Olsson, Sthlm-Vallingby, Sweden Application October 7, 1955, Serial No. 539,204

Claims priority, application Sweden October 22, 1954

2 Claims. (Cl. 324—102)

This invention relates to a method and a device for measuring direct and alternating voltages, mainly by means of an oscilloscope. One important use of this method is the accurate measurement of static as well as dynamic mechanical stresses and strains, e.g. fatigue stresses. The method is, however, generally applicable, also for other purposes.

The fatigue strength of materials is determined in special machines, in which specimens of the materials are subjected to cyclical variations of stress. These stresses may be alternating (differing in sign), pulsating (varying from zero to maximum value), or fluctuating (varying in magnitude, but not in sign).

The accurate determination of both static and dynamic stresses is extremely important. Static stresses can be determined with reasonable accuracy by presently available means. Dynamic stresses have up to now usually been determined by measuring the variations of oil pressure, or by optically observing the deflections of a calibrated spring, but both these methods are somewhat unreliable and insensitive.

Dynamic stresses have recently been directly measured by means of the active resistances in a bridge coupling, using an oscilloscope as an indicating instrument, and a carrier frequency modulated by the mechanical strains of the specimen under test. The full output voltage is admitted to the oscilloscope amplifier, and if the bridge is balanced by suitable means the stress variations can be determined from the setting of the balancing controls. The accuracy of the method is, however, limited by the fact that the complete amplitude of the alternating voltage must be fed to the amplifier, which might then easily be over-loaded. Other disadvantages of this method are: that the screen picture becomes weaker because the envelope of the carrier frequency must be observed, that the carrier frequency must be high in comparison with the fatigue frequency, and that the balancing must be both resistive and capacitive. Moreover, as both the bridge and the oscilloscope must be balanced, the adjustments are rather difficult.

D.C.-fed bridgse with D.C. amplifiers may also be used, but the drift in D.C. amplifiers will make the measurements very uncertain.

The main characteristic of the method of measurement according to the present invention is that only a certain time-fraction of the voltage is compared with a known, adjustable direct voltage by measuring the adjustment required for bringing the D.C. voltage and the voltage fraction to the same level. The accuracy of this measurement can be increased by amplifying the said voltage fraction by means of an A.C. amplifier. When an alternating voltage is to be measured, the moments for switching the said voltage fraction on and off from the oscilloscope are regulated by means of one or more delaying devices acting with reference to a selected point on the A.C. curve, e.g. its arithmetic mean value. According to the present invention, the same alternating voltage is thus made to perform two functions, neither of which has any deleterious effect on the other. In this case these functions are (a) the switching on and off, and (b) the measuring, of the said voltage. To that end, one parallel arm is made to switch on or off the alternating voltage fraction, while another parallel arm is coupled directly to the measuring instrument via one or more resistances. In measuring direct voltages, an alternating voltage of arbitrary frequency is used to operate the delaying devices.

According to the present invention, one or more active resistances, such for example as strain gages, converting mechanical deformations into corresponding resistance changes are accordingly arranged in a Wheatstone bridge coupling, one diagonal of which is connected to a direct supply. The resultant signal voltage between the other diagonal points of the bridge will then be substantially proportional to the stress applied to the test specimen. These diagonal points are connected to an indicating instrument, preferably a cathode ray oscilloscope.

Additionally, a separate switch can be provided to short-circuit the latter diagonal points, so that the signal voltage will be zero. This switch may be electrically, mechanically or otherwise operated by the fatigue machine, or by the strain on the test specimen.

The balancing of the bridge may also be effected by a special, accurately calibrated electrical device, e.g. a potentiometer. This allows a wide range for the selection of the stress resulting in zero output, and the two extreme stress values can also be brought within the balancing range by suitably dimensioning the balancing device.

Figure 2:
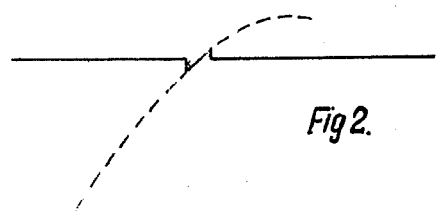
Figure 3:
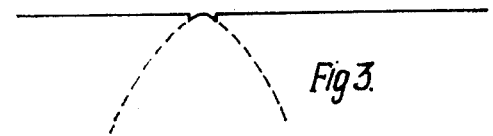
Figure 4:
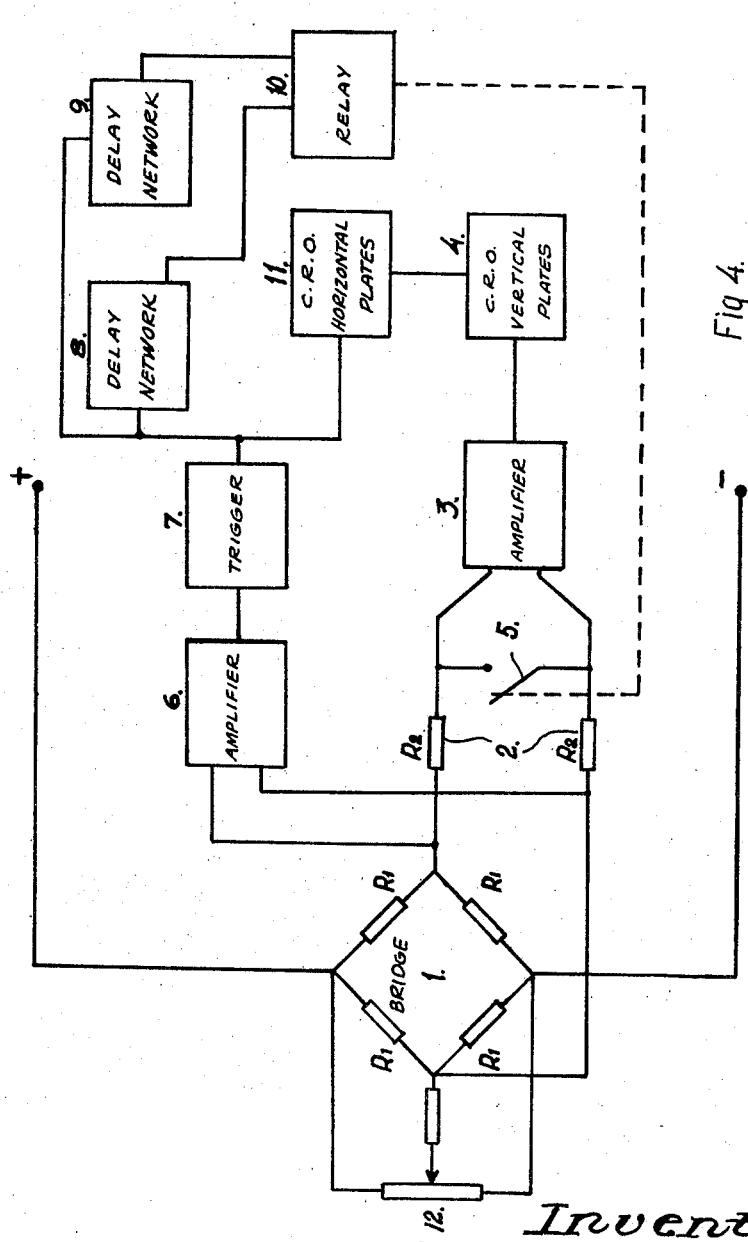

The invention will now be more closely described in connection with the accompanying drawings, wherein Figs. 1, 2 and 3 show different fractions of the voltage curve and Fig. 4 shows a block diagram of an apparatus for carrying out the method according to the present invention.

If the switch is closed throughout the whole process except for a short time interval, the picture on the screen can be according to Fig. 1. If this short time interval coincides with the moment when the signal voltage passes or is very close to zero, the signal voltage will obviously be very small. The picture on the screen will then show the fraction of the curve and a straight line on each side. This straight line comes from a D.C. voltage representing the closed position of the switch, i.e. when the signal voltage is short-circuited. The curve fraction can be magnified by means of a simple A.C. amplifier, and by means of the balancing potentiometer the straight line can be adjusted to agree accurately with the voltage fraction level (see Fig. 2). The reading on the balancing dial will then be a measure of the mechanical stress on the test specimen during that particular time-fraction. A study of the maximum and minimum values of the alternating voltage is of particular interest (see Fig. 3).

Generally, it is hardly of interest to study anything but the two extreme values. The switch can only be opened at the right point on the signal-voltage curve if the times for switching on and off can be arbitrarily selected within the given cycle. It is therefore expedient to fix on some definite point on the signal voltage cycle, and to introduce not only an adjustable delaying device to open the switch at the desired moment, but also a corresponding closing device. For this, some electrically or mechanically operated phase-displacing device will be required. The method adopted here must be deemed very rational, inasmuch as the signal voltage is allowed to act on suitable electronic circuits, which may be adjusted to open and close the switch at the desired moments after the signal voltage has passed its arithmetical mean value. No other connections will accordingly be required between the measuring device and the tested specimen than the leads to the active resistance. One form of the invention is shown in Fig. 4, where 1 is a bridge from which the signal voltage passes via two resistances 2 to a measuring signal amplifier 3 and—when amplified—to the vertical deflection plates of a cathode ray tube 4. The leads to the measuring signal amplifier 3 can be short-circuited by a switch 5. When this is closed, there will be no deflection on the cathode ray tube. Nevertheless, the signal voltage will pass with the aid of the resistances 2 through a parallel branch, where it is amplified and then allowed to act on a trigger 7. The function of this trigger is to give a short impulse each time the amplified A.C. signal voltage passes its arithmetrical mean value.

Note the difference between the terms A.C. signal voltage and signal voltage. An alternating signal voltage has no direct voltage component, and is for instance obtained when the signal voltage (which may have a direct voltage component) is allowed to pass through an A.C. amplifier.

The impulses from the trigger 7 are now allowed to act on two delaying circuits 8 and 9, of which the circuit 8 will, after an adjustable delay, supply current to a relay 10, which opens the switch 5. After some further likewise adjustable delay, the circuit 9 will supply current to the relay 10, which recloses the switch 5.

By suitably adjusting the circuits 8 and 9, starting for instance from the cyclical passage through zero, it is possible to open the switch 5 just before and close it just after the peak stress value. By observing the picture on the screen of the cathode ray tube, the balance control, a potentiometer 12 connected across the bridge 1, can be adjusted in such a way that the straight line on the screen is brought to the same level as the very peak of the signal voltage curve (Fig. 3).

The time axis 11 of the oscilloscope may be suitably synchronized by the trigger 7 so as to obtain a stationary picture.

In several processes it is of great importance that both the direct and the alternating voltages should be measured. In determining for instance the resistance to fatigue of a test specimen, the direct voltage obtained is generally overlaid by an alternating voltage, which may or may not be symmetrical. The present invention permits the measurement of both components. The device can also be used for pure D.C. measurements, e.g. temperature measurements by means of thermoelements.

When the arrangement shown in Fig. 4 is used for measuring direct voltages, the switch 5 is opened periodically at arbitrary intervals, and the balance control 12 is adjusted so that the picture on the oscilloscope screen becomes a straight line.

The sensitivity to mechanical strains of an apparatus arranged in this way, has been found to be better than $10^{-6}$. Given equal extension of the specimen, and equally small magnitudes to be measured, its accuracy is thus about 10 times better than that of the carrier frequency method, and about 100 times better than that of optical or mechanical methods.

The same method can also be used with inductive, capacitive or other A.C. pickups, but the original voltage must then be demodulated before it is switched on to the oscilloscope as stated above.

We claim:

1. A test apparatus for A.C. measurement and including an oscilloscope comprising in combination, a bridge circuit to derive an unknown voltage in accordance with a condition of a specimen under test, a circuit including a short circuiting switch and an amplifier connected between the bridge circuit and the oscilloscope, a parallel circuit connected between the bridge circuit and the oscilloscope and comprising a pair of delay networks respectively operable to open and close said switch in response to the derived voltage whereby only a predetermined time fraction of the unknown voltage is displayed on the oscilloscope, and a trigger circuit connected between the said bridge and the said delay networks to initiate the action thereof.

2. The invention as set forth in claim 1, including calibrated means to reduce the derived voltage to zero thereby revealing the amplitude of said voltage.

References Cited in the file of this patent

UNITED STATES PATENTS

| | | |
|---|---|---|
| 2,293,135 | Hallmark | Aug. 18, 1942 |
| 2,548,276 | Wisbecker | Apr. 10, 1951 |
| 2,731,583 | Ellis | Jan. 17, 1956 |